April 12, 1927.  M. KOSTENKO ET AL  1,624,254
HIGH SPEED DYNAMO ELECTRIC MACHINE FOR CONTINUOUS CURRENT
Filed March 19, 1923    2 Sheets-Sheet 1
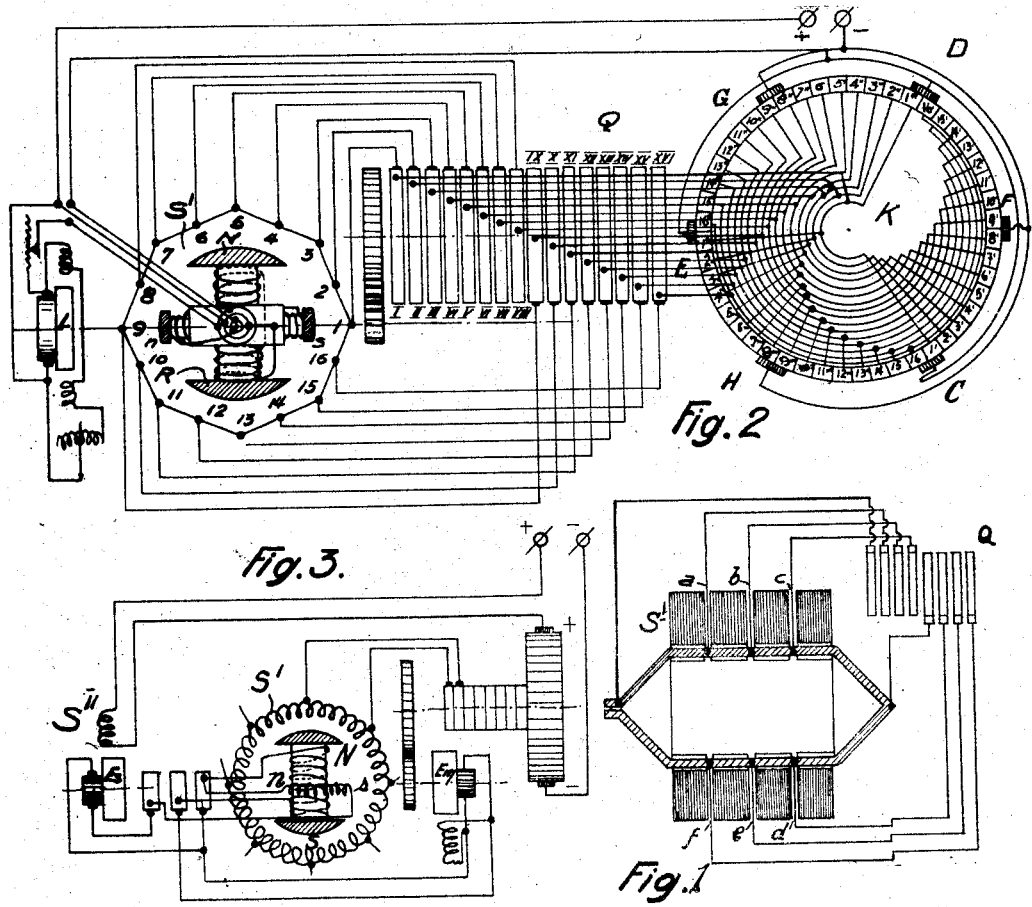
Inventors:
M. Kostenko
N. Japolsky April 12, 1927.  M. KOSTENKO ET AL  1,624,254
HIGH SPEED DYNAMO ELECTRIC MACHINE FOR CONTINUOUS CURRENT
Filed March 19, 1923   2 Sheets-Sheet 2

Inventors
M. Kostenko
N. Japolsky

Patented Apr. 12, 1927.

1,624,254

UNITED STATES PATENT OFFICE.

MICHAEL KOSTENKO AND NICOLAS JAPOLSKY, OF LONDON, ENGLAND.

HIGH-SPEED DYNAMO-ELECTRIC MACHINE FOR CONTINUOUS CURRENT.

Application filed March 19, 1923, Serial No. 626,132, and in Switzerland February 5, 1923.

High speed alternating current machines having a small number of poles can be constructed for obtaining very high outputs; machines for continuous current on the other hand for very great peripheral speeds and great outputs have hitherto not been known. Further, it has hitherto not been possible to collect considerable power through stationary brushes resting on a relatively movable commutator.

The subject of the present invention is a high speed dynamo-electric machine having a small number of poles and yielding a large continuous current. The induced part of the machine is stationary, while the inducing part rotates. The machine has two collectors, one is provided with rings and the other with segments. Both collectors rotate at a speed, which is smaller than that of the inductor, the armature winding being connected to the rings of the ring collector by brushes, and each of the said rings being connected to a plurality of the segments of the segment collector or commutator, the arrangement being such that the stationary brushes, which rest on the relatively moving segment commutator collect continuous current.

The number of inductor poles is smaller than the number of brushes on the segment commutator and, the arrangement is such that the number of revolutions of the inductor during unit time multiplied by the number of poles of the said inductor, equals the number of revolutions of the commutator per unit time multiplied by the number of brushes on the segment commutator.

Various constructional forms of the invention are diagrammatically illustrated in the accompanying drawings, in which:—

Fig. 1 indicates a preferred form of the connections between the stator and the ring collector or slip rings.

Fig. 2 shows one form of the complete machine.

Figs. 3, 4, 5 and 6 show various modified forms of the machine.

In the constructional form shown in Fig. 2 R is the inducing part (inductor) of the machine having two main poles N, S while S' is the induced part or armature of the machine. The ring collector Q has 16 rings, which are marked I, II . . . XVI. On the periphery of the segment commutator K are provided six stationary brushes C, D, E, F, G and H. It is necessary for the two collectors to rotate at a speed which is smaller than that of the inductor, both speeds having a definite relation to each other, so that if $n_R$ is the number of revolutions of the inductor and $n_K$ the number of revolutions of the collectors, P the number of poles of the inductor, B the number of brushes, then:

$$n_R \times P = n_K \times B.$$

In the example shown in Fig. 2, it is therefore necessary for the collectors to rotate at a speed which is equal to one-third of the speed of the inductor. The armature S' has 8 windings. The ends and the middle points of each winding are each connected to one of the sixteen rings I—XVI of the ring collector Q. Each ring of the collector is connected to three segments of the commutator K. These segments are 120° apart. Thus, for instance, the ring I is connected to the segments 1', 1'', 1'''. The ring II is connected to 2', 2'', 2'''. The brushes C, D, E on the one hand and F, G, H on the other hand are at a definite moment connected to the same ring. Thus three each can be connected together as shown in the diagram.

The continuous current required for exciting the inductor is produced by a separate exciter L. For facilitating the commutation two auxiliary poles are provided on the inductor, which are fed with continuous current, the strength of which is proportional to that of the stator current. The auxiliary poles $n$ and $s$ are connected to the main circuit by means of two rotating rings.

The constructional form shown in Fig. 3 differs from the previous one by the provision of a separate excitation for the two auxiliary poles $n$ and $s$. The exciter $E_m$ works on the two main poles of the inductor, while the exciter $E_s$ works on the auxiliary poles $n$ and $s$. The inductor winding S'' of the exciter $E_s$ is connected in series with the main current. Thus for a constant speed of the exciter $E_s$ the electromotive force of the latter is almost proportional to the current of the main circuit.

Figure 4:
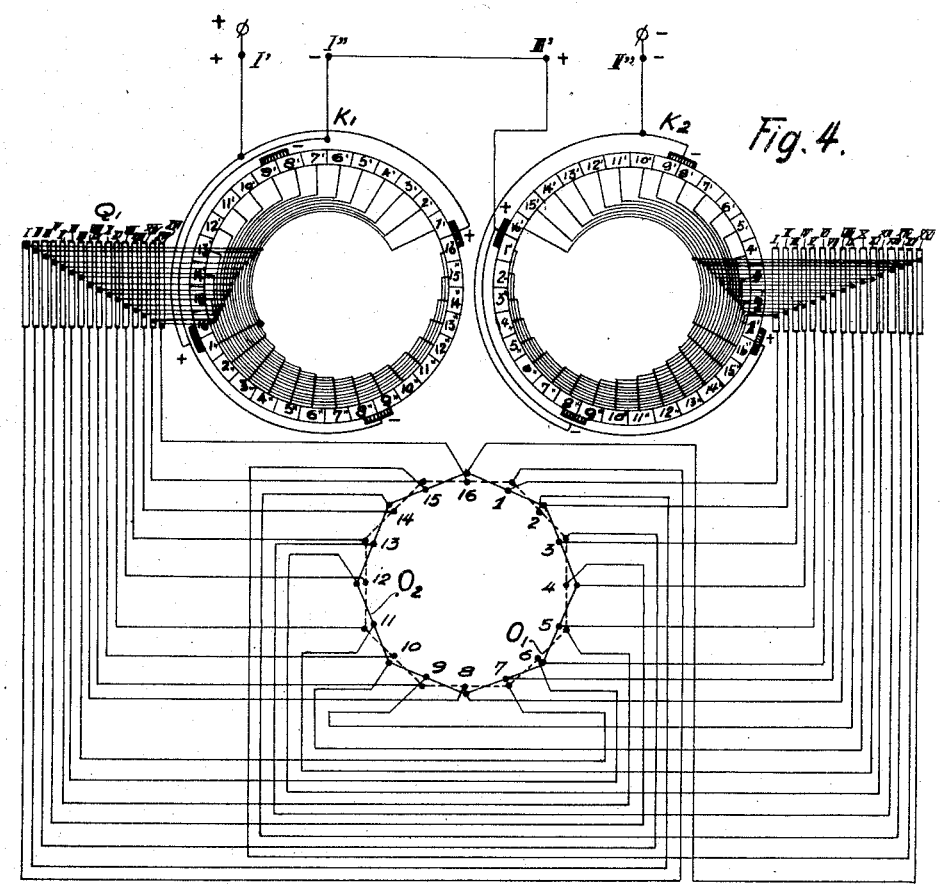

In the constructional form shown in Fig. 4 the armature S has two independent windings $O_1$ and $O_2$. Each of these windings is connected to a corresponding ring collector $Q_1$ and $Q_2$. The collector $Q_1$ is also connected to the segment commutator $K_1$, while the collector $Q_2$ is connected to the segment commutator $K_2$. The number of poles of the inductor is in each case assumed to be two, while the number of brushes in contact with the segment commutator is four for each of these commutators. Thus the speed of the collectors $Q_1$ and $K_1$ and that of the collectors $Q_2$ and $K_2$ will be half the speed of the inductor.

In the diagram shown in Fig. 4 the two commutators $K_1$ and $K_2$ are connected to each other in series. By this means the machine will give double the voltage that can be given by a single commutator. If $a$ independent windings were placed on the armature $S'$, a voltage $$V = a \times V_k$$

would be obtained at the terminals of the machine, in which case $V_k$ would represent the voltage of a single commutator. The commutators might also be connected in parallel. With the construction described, between two consecutive segments of the commutator, there may be connected up a portion only of an armature conductor. This is of particular advantage in the case of high speed machines giving off very high voltage, in which the voltage included in each wire of the armature may exceed that permissible between two commutator segments. On the other hand as the armature is stationary, the connection of the armature to the ring collector may be made through the ventilating passages $a$, $b$, $c$, $d$, $e$, $f$ as shown in Fig. 1.

Figures 5, 6:
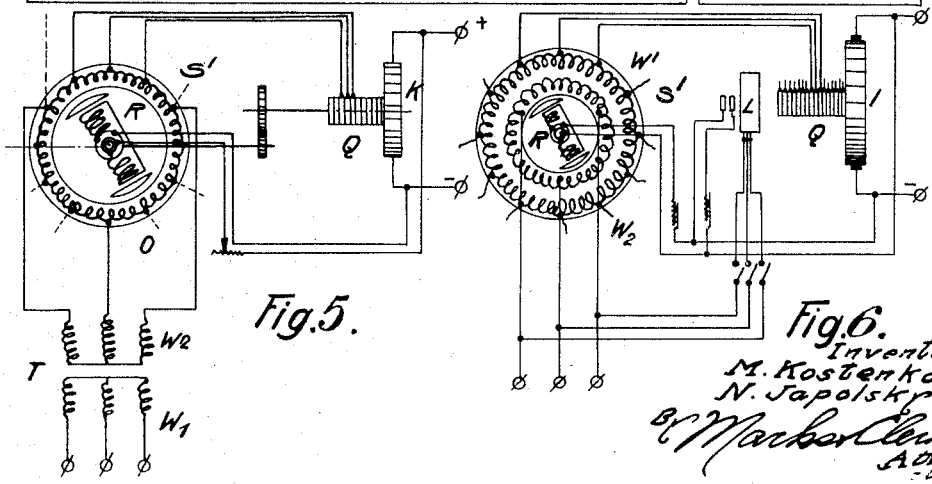

Fig. 5 diagrammatically indicates a dynamo-electric installation for converting alternating current into direct current, or vice versa.

$S'$ is a stationary armature whose winding O is connected on the one hand to the secondary winding $W_2$ of a transformer T, and on the other hand, as described above, to the rings of the collector Q.

The collector Q is secured to the commutator K and is mechanically driven by means of the rotor R.

The commutator K supplies continuous current to the direct current mains.

The electromotive force between the different points of the winding O is produced by the moving magnetic field due to the rotor R.

This rotor R is magnetized by continuous current supplied through slip-rings from the direct current mains.

The alternating current mains are connected to the primary winding $W_1$ of the transformer T.

Fig. 6 diagrammatically indicates another form of dynamo-electric installation for converting alternating current into direct current or vice versa.

This machine works in a similar way to the machine shown in Fig. 5, but in this case the armature S has two separate windings, one $W_1$ being connected to the alternating current terminals of the machine, while the other $W_2$ is connected to the collector Q and thence through the commutator K to the continuous current terminals.

The rotor R is magnetized, as before, by continuous current supplied through slip-rings from the direct current mains.

The collector Q and commutator K are mechanically driven by a synchronous motor L which is driven by alternating current supplied from the alternating current mains. The number of poles of the motor L is equal to the number of brushes of the commutator K. The direct current for the magnets of the motor L is supplied from the direct current mains.

Since the windings $W_1$ and $W_2$ for the alternating and direct currents are separate from one another, the transformer T of Fig. 5 is dispensed with, as the necessary increase or reduction in the alternating current voltage can be obtained by varying the number of bars in the winding $W_1$.

The high speed machines permit of an intense utilization of the copper, and they work with a very high efficiency. Therefrom it results that the efficiency of the arrangements described will be a very high one.

What we claim is:—

A high speed dynamo electric machine for continuous current of the type generator, motor, converter, comprising a stationary armature with ventilating passages, a rotating inductor, two commutators rigidly connected with each other, one formed of a set of insulated rings and the other of a set of insulated segments, leads connecting the rings with the corresponding segments, and two sets of brushes, one set contacting with the insulated rings and connected with the armature winding by leads passing through said passages in the armature, and the other set contacting with the commutator segments, and means for rotating the commutator at a speed which is a sub-multiple of that of the inductor, so that the two sets of brushes act to transmit direct current.

In testimony whereof we hereunto affix our signatures.

MICHAEL KOSTENKO.
NICOLAS JAPOLSKY.